July 18, 1950 P. A. WELLIVER ET AL 2,515,935
SAFETY DEVICE FOR AUTOMOBILE DOORS
Filed July 29, 1947
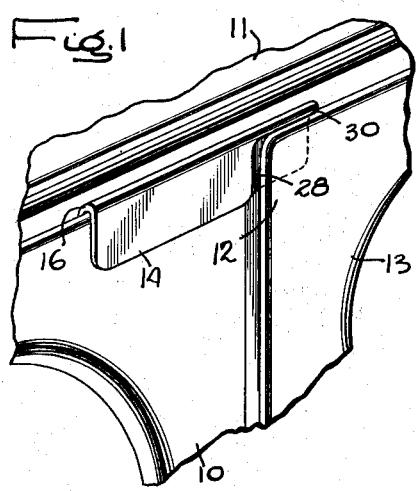
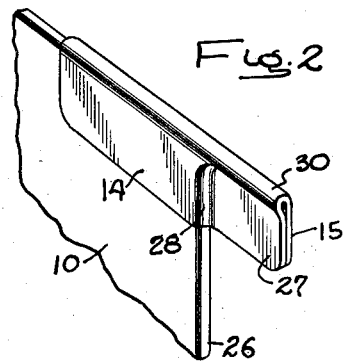
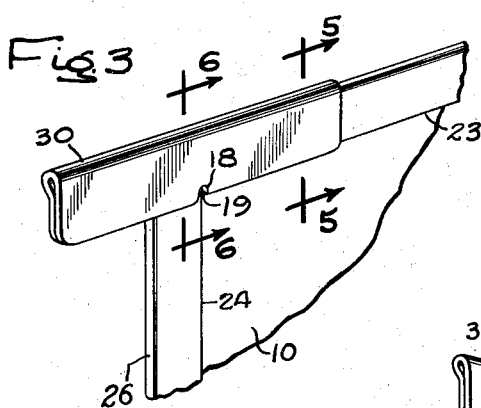
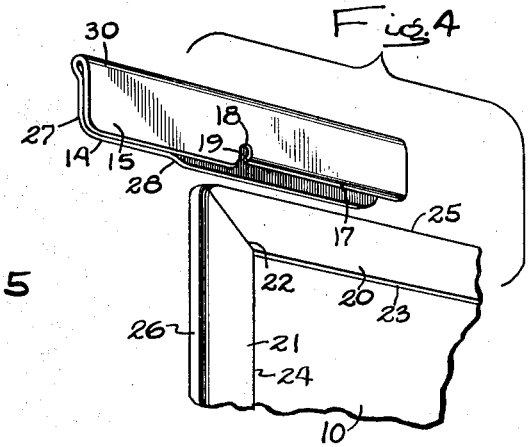
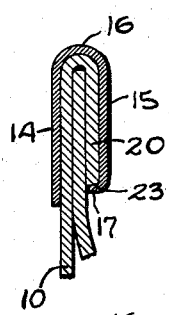
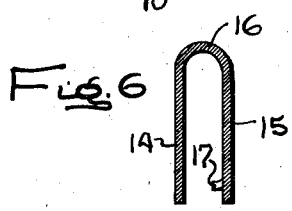
INVENTOR
Paul A. Welliver
Edward V. Welliver
By Carlson, Pitzner, Hubbard & Wolfe
ATTORNEYS Patented July 18, 1950

2,515,935

UNITED STATES PATENT OFFICE 2,515,935

SAFETY DEVICE FOR AUTOMOBILE DOORS

Paul A. Welliver and Edward V. Welliver, Rockford, Ill.

Application July 29, 1947, Serial No. 764,374

17 Claims. (Cl. 292—1)

This invention relates to a safety device attachable to one door of a four door automobile and overlapping the adjacent door to prevent opening of one door when the other door is closed, thereby avoiding the danger of the one door being opened accidentally by children.

A general object is to provide a device of the above character which may be made as a simple sheet metal stamping, which is simple to attach to an automobile door, and which is held on the door effectually against accidental displacement.

A more detailed object is to provide an elongated bar of U-shaped cross section having stops thereon adapted to interlock with parts of an automobile door as an incident to sliding of the bar onto one door margin.

The invention also resides in the novel construction of the stops by which the bar is held on an automobile door.

Other objects and advantages of the invention will become apparent from the following detailed description taken in connection with the accompanying drawings, in which Figure 1 is a fragmentary perspective view of two automobile doors equipped with the improved safety device.

Figs. 2 and 3 are perspective views of the device mounted on a door.

Fig. 4 is a perspective view of the device separated from the door on which it is to be mounted.

Figs. 5 and 6 are sectional views taken respectively along the lines 5—5 and 6—6 of Fig. 3.

While the invention is susceptible of various modifications and alternative constructions, we have shown in the drawings and will herein describe in detail the preferred embodiment. It is to be understood, however, that we do not intend to limit the invention by such disclosure but aim to cover all modifications and alternative constructions falling within the spirit and scope of the invention as expressed in the appended claims.

In the exemplary embodiment of the invention shown in the drawings, the improved safety device is mounted on the rear door 10 of an automobile body 11 in a position to underlie the upper adjacent corner 12 of the front automobile door 13 on the inner side thereof so that the latter door holds the rear door against opening when the front door is closed. Such doors are formed of a metal sheet the margins 20 and 21 of which are bent over on the inside of the door and mitered at 22 to form flange edges 23 and 24 spaced a short distance from the edges 25 and 26 which define the corner of the door.

The safety device comprises generally an elongated bar formed by bending a sheet of metal along its longitudinal centerline to a generally U-shaped cross section so as to form two parallel side pieces or strips 14 and 15 integrally connected along one margin by a fold 16 of arcuate section imparting rigidity to the bar as a whole. At one end of the bar, the side pieces 15 and 16 are spaced apart laterally so as to straddle the door margin when the bar is slid endwise onto the door with the edge 25 in contact with the inner surface of the fold 16.

The side piece 15 which lies along the inner side of the rear door 10 is flat and the end portion which overlaps the door is formed with a stop which engages behind the door edge 23 and holds the bar against tilting in the plane of the door. Herein this stop is formed by a right angular flange 17 bent from the edge of the piece opposite the fold 16. The flange is relatively narrow and its edge is spaced from the side piece 14 sufficiently to enable the bar to be slid onto the door by a slight separation of the flange and the side piece 14. To permit the flange 17 to be terminated intermediate the ends of the bar, the side piece 15 is notched as indicated at 18.

Another stop is formed intermediate the ends of the bar and between the side pieces thereof in a position to engage the other flange edge 24 of the door and hold the bar against reverse endwise movement off from the door. Herein this stop is formed by the inner end 19 of the flange 17. Thus, as the bar is slid onto the door, the stop 19 will drop in behind the edge 24 and resist reverse sliding of the bar.

A third stop is formed on the bar to limit the extent of sliding of the bar onto the door so as to leave a substantial length 30 of the bar projecting beyond the door edge 26. This stop is defined by a transverse bend 28 in the side piece 14 formed by depressing the outer end portion 27 of this piece against the side piece 15. The inner surface of the bend 28 faces toward the stop 19 and is spaced therefrom a distance equal to the width of the door flange 21 so that when the bar has been slid onto the door along the edge 25 a distance sufficient to bring the stop 28 against the door edge 26, the stop 18 will have just passed and moved in behind the edge 24.

By depressing the end portion 27 of the side piece against the side piece 15, the flattened bottom surface of the depression is set inwardly slightly from the plane of the vertical free edge of the rear door 10 and disposed between and parallel to the more widely spaced portion of the bar. Thus, a recess is formed in the projection 30 for receiving the corner 12 of the front door 13 so as to permit complete closure and latching of the same when the rear door 10 is closed. The flattened portion of the projection 30 of the bar thus lies inside of the front door so that the latter, acting through the intermediary of the bar on the rear door, positively holds the latter door against opening so long as the front door remains closed. However, when the front door is opened, the projecting bar end is no longer blocked and the rear door may be opened in the usual way. Accidental or intentional opening of the rear door by children is thus prevented. By inserting a tool between the projecting ends of the side pieces 14 and 15 or otherwise prying the two apart, the bar may be slid reversely and thus removed from the door.

We claim as our invention:

1. An automobile door safety device comprising, an elongated flat side piece having a narrow inturned flange along one edge terminating intermediate the ends of said piece to provide a stop, a second side piece of similar width having one end portion paralleling said first piece along and beyond said flange and spaced from the latter to permit the insertion of an automobile door edge between the pieces, and the other end portion depressed against said first piece so as to underlie the edge of an adjacent automobile door, and an arcuate bend integrally joining the edges of said pieces opposite said flange and throughout the lengths of the pieces.

2. A device for the character described comprising two elongated metal strips spaced apart at one end and pressed together at the other end, means rigidly connecting said strips along one edge, two longitudinally spaced stops formed on said strips intermediate the ends thereof and facing toward each other and longitudinally of the strips, one of the stops terminating short of the side of the opposite strip, and means on one of said strips projecting toward the other strip and providing a third stop facing toward and spaced from said connecting means.

3. An automobile door safety device comprising, two elongated metal strips spaced apart at one end to receive the edge of one automobile door between them with the other ends of the strips underlying an adjacent door of the automobile, means rigidly connecting said strips along one edge, a flange on the other edge of one of said strips adapted to underlie the reversely bent flange on said first door, a stop formed on one of said strips intermediate the ends thereof, and engageable with the right angular edge of said first door, and a second stop on one of said strips facing toward said first stop and engageable with the reversely bent flange on the edge of said adjacent door.

4. A safety device of the character described comprising, an elongated flat piece having a narrow inturned flange extending along one edge and terminating intermediate the ends of the piece in a stop, a second piece of similar length and width having one end portion paralleling said first piece and spaced from said flange, the other end portion being depressed toward said first piece and terminating short of said stop to provide a second stop facing toward and spaced from said first stop, and means rigidly connecting the other edges of said pieces.

5. A safety device of the character described comprising, a bar of U-shaped cross section adapted to slide onto one margin of an automobile door at the upper corner thereof, with the laterally spaced legs of the bar straddling said door margin, a stop formed on one of said legs and engageable with the right angular edge of the door to limit the extent of said sliding movement and leave one end portion of the bar projecting from the door beyond the latter margin thereof, a stop on one of said legs being engageable behind the reversely bent flange on said second door margin to hold said bar against reverse sliding, and a third stop on one of said legs engageable behind the reversely bent flange of said first door margin and operable to prevent tilting of said bar in the plane of said door margins.

6. A safety device of the character described comprising, a bar of U-shaped cross section adapted to slide onto one margin of an automobile door at the upper corner thereof, with the laterally spaced legs of the bar straddling said door margin, a stop formed on one of said legs and engageable with the right angular edge of the door to limit the extent of said sliding movement and leave one end portion of the bar projecting from the door beyond the latter margin thereof, a stop on one of said legs being engageable behind the reversely bent flange on said second door margin to hold said bar against reverse sliding, and a third stop on one of said legs engageable behind the reversely bent flange of said first door margin and operable to prevent tilting of said bar in the plane of said door margins, the projecting portion of one of said bar legs being depressed toward the other leg to provide a recess for receiving the upper corner of an adjacent automobile door.

7. A safety device of the character described comprising, a bar of U-shaped cross section adapted to slide onto one margin of an automobile door at the upper corner thereof, with the laterally spaced legs of the bar straddling said door margin, a stop on said bar between said legs and intermediate the bar ends limiting the extent of said sliding movement, means on one of said legs engageable with a part of said door to prevent tilting of the bar in the plane of the door, and means on one of said legs engageable with a part of said door to prevent reverse endwise sliding of the bar relative to door.

8. An auxiliary safety latch for use on vehicles having adjacently-opening flanged doors including, an elongated flat body having a channel in one end thereof, the channel being open at one end and at the lower edge portion of the body, whereby the channel receives the top and front free edge portions of a door flange so as to frictionally mount said latch upon one of the vehicle doors, and a flat tongue offset at the opposite end of said body projecting beyond the door upon which said latch is mounted and into the path of movement of the other of said doors for engaging the free edge portion of said other door flange to prevent accidental opening of said one vehicle door when both doors are in closed position.

9. In an auxiliary lock for use in connection with the adjacent free edge portions of a pair of adjoining doors, a rigid one-piece elongated body member having one end portion thereof provided with a channel formed to receive the free edge portion of one of said doors and having its opposite end portion provided with a right-angled shouldered depression formed to receive the free edge portion of the other of said doors.

10. An auxiliary lock of the character described including, a strip of sheet material bent upon itself along its longitudinal axis to provide a rigid elongated body of substantially rectangular configuration when viewed in plan and of substantially U-shaped formation in end elevation, said body being provided with an outwardly facing channel extending through one of its side edges and one end and having one of its side faces formed with a depressed portion at the opposite end thereof, said depressed portion lying in the plane of said channel.

11. An auxiliary safety latch for one of a pair of adjoining doors of a multi-doored vehicle, each of said doors, having free upper and lower end edges and a free front edge, including a one-piece elongated substantially rigid sheet metal body, and resilient securing means formed on one end of said body for readily detachable frictional engagement with at least one of the said free edges of one of the doors so as to be supported thereby, the overall length of said body being such that the opposite end thereof extends toward and into the path of movement of an adjacent free edge of the other of said pair of doors, said last-named projecting end of the body being engaged with said adjacent free edge of the last named door to prevent independent opening movement of said one door when both doors are closed.

12. An auxiliary safety latch in accordance with claim 11, wherein the one-piece elongated substantially rigid sheet metal body has its projecting end formed with a depressed part to be engaged with a free part of the said other adjoining door.

13. A vehicle door lock comprising a one-piece elongated rigid body member having one end portion formed with a recess of predetermined length and depth opening through one end and one side edge thereof, the internal opposed faces of the walls defining the recess being spaced apart a distance substantially equal to the thickness of the free edge portion of a vehicle door so as to receive and frictionally engage the same, and the other end portion of the body member having a flat depressed portion extending for a predetermined distance inwardly of the opposite end edge thereof to provide a tongue.

14. A device for interlocking automobile doors and the like comprising a resilient clip for detachable connection to the door to be controlled and a tongue extending from said clip and adapted to underlie a controlling door.

15. A device for interlocking automobile doors and the like comprising a resilient clip including spaced gripping portions lying in parallel planes and a tongue extending from said clip substantially in the plane of one of said gripping portions.

16. In an automobile comprising a front door and a rear door and an intermediate post, said doors having marginal flanges overlying portions of said post and lying in adjacent positions when the doors are closed; the improvement that comprises a spring clip gripping a portion of the flange of the rear door which lies adjacent the front door when the doors are closed, and a tongue extending from said clip and underlying the flange of the front door when that door is closed.

17. The improvement as claimed in claim 16 wherein the clip and tongue are integral and the clip resiliently engages the rear door flange.

PAUL A. WELLIVER.
EDWARD V. WELLIVER.

REFERENCES CITED

The following references are of record in the file of this patent:

UNITED STATES PATENTS

| Number | Name | Date |
|---|---|---|
| 2,311,132 | Schnell | Feb. 16, 1943 |

OTHER REFERENCES

Popular Science, June 1946, page 137.
Popular Science, July 1947, page 144.